March 7, 1967 C. M. ADAMS, JR 3,308,266
METHOD AND APPARATUS FOR WELDING OF RAILS
Filed Jan. 15, 1963 7 Sheets-Sheet 1

INVENTOR
CLYDE M. ADAMS, JR.
BY
ATTORNEY

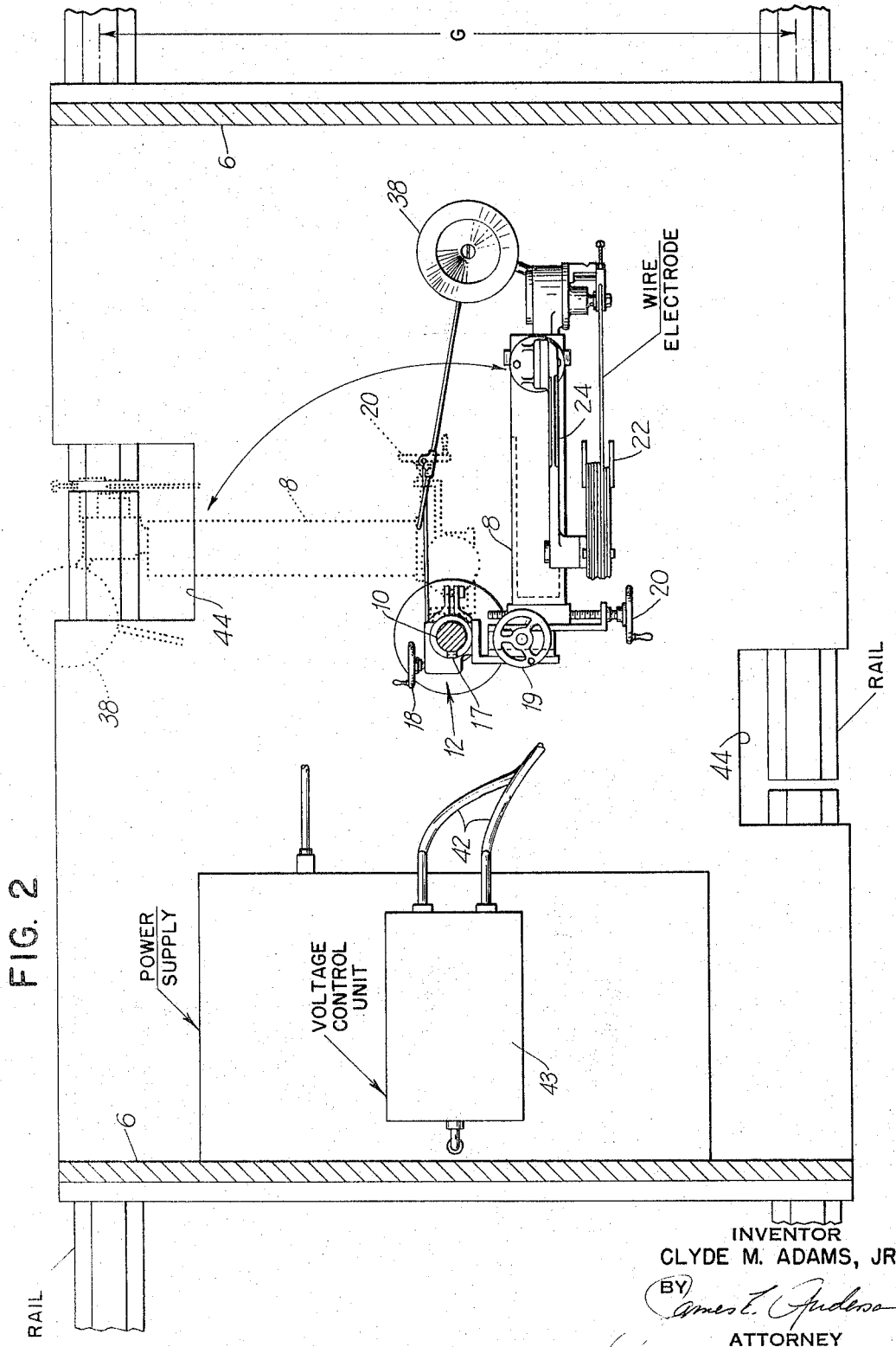

INVENTOR
CLYDE M. ADAMS, JR.
BY
ATTORNEY

March 7, 1967   C. M. ADAMS, JR   3,308,266
METHOD AND APPARATUS FOR WELDING OF RAILS
Filed Jan. 15, 1963   7 Sheets-Sheet 4

INVENTOR
CLYDE M. ADAMS, JR.
BY
ATTORNEY

March 7, 1967   C. M. ADAMS, JR   3,308,266
METHOD AND APPARATUS FOR WELDING OF RAILS
Filed Jan. 15, 1963   7 Sheets-Sheet 5

INVENTOR
CLYDE M. ADAMS, JR.
ATTORNEY

March 7, 1967  C. M. ADAMS, JR  3,308,266
METHOD AND APPARATUS FOR WELDING OF RAILS
Filed Jan. 15, 1963  7 Sheets-Sheet 6

INVENTOR
CLYDE M. ADAMS, JR.
BY
ATTORNEY

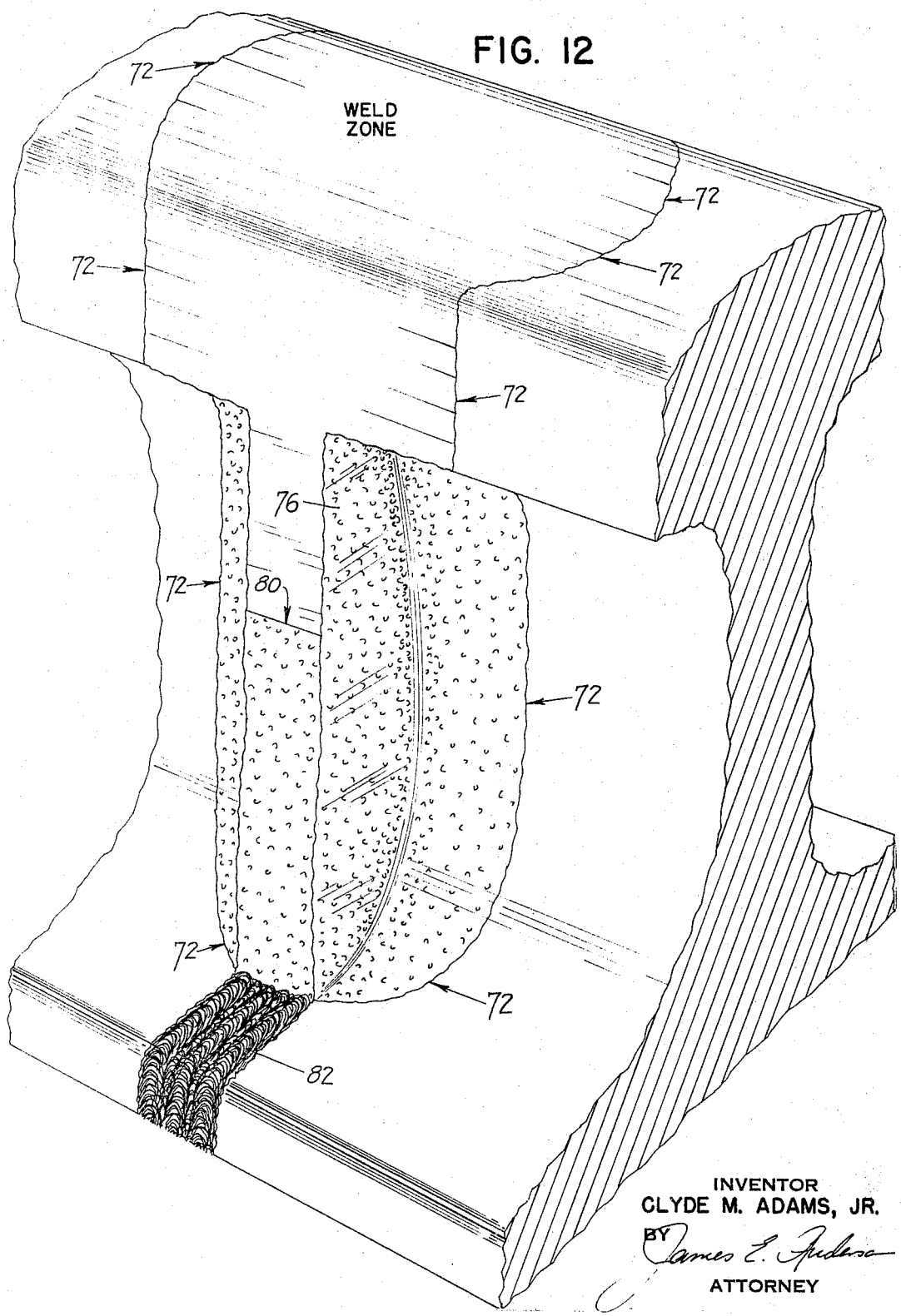

United States Patent Office 3,308,266
Patented Mar. 7, 1967

3,308,266
METHOD AND APPARATUS FOR WELDING OF RAILS
Clyde M. Adams, Jr., Lexington, Mass., assignor to American Machine & Foundry Company, a corporation of New Jersey
Filed Jan. 15, 1963, Ser. No. 251,613
33 Claims. (Cl. 219—137)

This invention relates to the welding of rails in railroads.

The manifold advantages of welding rail into "continuous rail" or "ribbon rail" have for some time evoked increasing interest in the railroad industry and such welding is universally a desirable objective. These advantages are principally that maintenance costs of "continuous welded" rail are much lower than for mechanically jointed rail and it provides smoother, more quiet rail travel. A substantial portion of present maintenance costs is attributable to troubles, such as shock damage, arising from the use of mechanical joints. Despite the advantages of welded rail, however, it has been estimated that less than 1% of rail in the United States is continuous welded. The main reason for this is that for most railroads the expenditure and investment in terms of cost per weld is prohibitive.

In all of the large scale welding projects undertaken heretofore, impossibility to weld rails while in place on their bed or foundation has been inherent in the particular methods used. In some cases the rails have been picked up bodily and replaced after welding at the site, while in others the rails have been welded at a point remote from the road and transported there in long lengths. Very high costs of handling the rails in such manner is one of the main factors which have blocked any widespread transition to continuous welded rail. Also, the temporary removal of a line from service due to the lifting of rails during welding thereof is a major problem in most cases.

In the welding of rail by those methods and equipment which have been more popular, namely acetylene gas and electric flash pressure welding, another major reason contributing to high costs has been the large capital investment in special equipment. In both types of pressure welding, the adjacent rail ends are heated to a state of plasticity and then thrust together under great axial force. The equipment needed to perform such operations obviously must be massive and complex. Also, the cost of heating is considerable, particularly in the case of acetylene gas welding.

Other drawbacks of the equipment used for pressure butt welding are that it is not readily portable and several problems arise in connection with the preparation and shapes of rail ends. It obviously is more convenient and inexpensive to provide a portable unit for welding rails in place than to lift the rails and transport them to and from stationary welding equipment. In the welding of used rail by acetylene gas or electric flash pressure butt welding, special difficulties occur because the initial positioning and end configurations of adjacent rails to be joined are highly critical factors. Also, in both processes a meticulous cleaning of the rail ends is an absolute necessity. This problem is aggravated in cases where used rails are not of uniform cross section.

Other approaches to rail welding have comprised the thermite process and manual arc welding. The thermite process, which depends on the violently exothermic chemical reaction between iron oxide and powdered aluminum, has been unsatisfactory for several reasons. In this process, rails must be lifted to provide complete access; there are difficulties in controlling critical process variables such as concentrations of silicon and aluminum; the welds tend to be of non-uniform strength and to be characterized either by brittleness or severe porosity in the fusion zone; and since strength is achieved at the expense of ductility, the weld is susceptible to spalling and fracture under impact. In thermite welding the cost of materials is high or, viewing it differently, the thermite chemical reaction is a very expensive source of thermal energy. With regard to manual arc welding, though good welded joints can be produced the cost is high and it is beyond consideration for the large scale conversion of roads to continuous welded rail. Reasons for this are the high degree of operator skill required; the need for special joint preparation, pre-heating and intermittent chipping; and the fact that high carbon steels are difficult to weld in this manner without cracking. Furthermore, in both thermite and manual arc welding the completion of a single weld typically will take more than one hour of time.

Predominant in one process of arc welding has been the manipulation of a specially coated, low-hydrogen type stick electrode in combination with "auxiliary pieces." This type of process is exemplified by U.S. Patents 2,824,952 and 2,948,805. As a form of enclosed welding, the process depends on the importance of successively building up auxiliary pieces, with a gap that permits excessive slag to escape while containing the pool of molten metal. This process is essentially manual and it involves interruptions necessitated by replacement of electrodes and positioning of metallic auxiliary pieces. When viewed as a whole, enclosed welding as practiced heretofore is entirely too unwieldy and slow in practice and entails too many complications to be adaptable to continuous rail welding on a commercially feasible basis. Also, the cost of these especially coated stick electrodes is not as low as would be desired.

Prior to the present invention, no known procedure had been perfected for welding rail in place while meeting all the other requirements of reasonably low cost per weld, small capital investment, a rapid weld production rate, and a high quality of weld. As previously mentioned, the economic factors influencing unit costs are related presently to factors such as the necessity of lifting and/or transporting rails, the size and complexity of equipment needed, the high cost of power and materials, and the need for highly skilled labor in most instances.

A method and an arrangement of facilities meeting all of the above-mentioned requirements has now been perfected and constitutes the present invention. By this invention, good welds can be simply, cheaply and rapidly produced in rails undisturbed and in place. No handling of the rails or special preparation of the ends thereof is required, and the relative disposition of rail ends is not critical to quality of weld. The investment in equipment is low because it can be made up principally from commercially available components which are known per se.

Briefly, in the solution of rail welding problems as disclosed in accordance with this invention, continuous, uncoated consumable wire electrode is employed in a new form of submerged arc welding involving the introduction of granulated flux or slag-forming composition and use of a simple, expendable mold preferably comprising a highly insulative refractory material. The electrode can be fed very rapidly and energized by adapting to this process a standard unit of the type commonly employed in other welding operations such as the horizontal seaming of plates and the like. Such a unit typically comprises a wire feeder and nozzle assembly, with a control unit responsive to the arc voltage for effecting feeding of wire at the proper rate. Slag forming material can be fed automatically from a hopper associated with the welding unit. A mobile welding unit incorporating this equipment is readily portable, simple and inexpensive as compared to the massive, stationary machines such as used for acetylent gas and electric flash pressure welding. A principal advantage is that any requirement of imposing axial thrust on the rails is completely absent. With regard to operating expense, a comparatively small and not highly skilled operating crew is needed, and the total cost of continuous electrode, refractory molds, and slag forming material amounts to less than material costs in the other processes discussed herein.

The quality of a weld and the effects produced in areas adjacent thereto are determined to a great extent by the characteristics of a rapidly changing balance between heat (power) input and heat transfer away from the weld. The extent and rate of heat penetration and the rate of melting and solidification are involved in this balance and directly affect the resulting structure of the rail and finished weld. As described more fully hereinafter, this invention attains optimum heat distribution characteristics by combining very high energy input rate through the continuous electrode and restricting heat dissipation by means of a special mold. Some of the highly significant results of this comparatively higher energy input rate are that (for technical reasons also described hereafter) the thermal efficiency of the process is higher and solidification rate is more favorable.

The objects and problems discussed in the above introductory paragraphs apply equally to ordinary unhardened rail of the types used for long distance freight and passenger lines and to hardened rail of the types used for special purposes such as shipyards and urban rapid transit lines. Due to the high heat input in the welding process, some areas adjoining the fusion zone inevitably will reach a temperature, generally in the 900° to 1,500° F. range, at which loss of hardness will occur. It is, therefore, a desirable object to minimize the extent of the "heat affected" zones. One of the many significant advantages inherent in the invention is that the size of the heat affected zone is held to a minimum. Another advantage consistent with this object is that preheating is not involved as is true in the cast of some other methods discussed above.

Further objects, advantages and details of this invention will become apparent from the following description, read in conjunction with the accompanying drawings in which:

FIGURE 2 is a plan view of the mobile unit shown in FIGURE 1, with the roof broken away to expose the welding head;

FIGURE 12 is a perspective view of the welded joint between a pair of rail ends following the complete finishing thereof.

Figure 1:
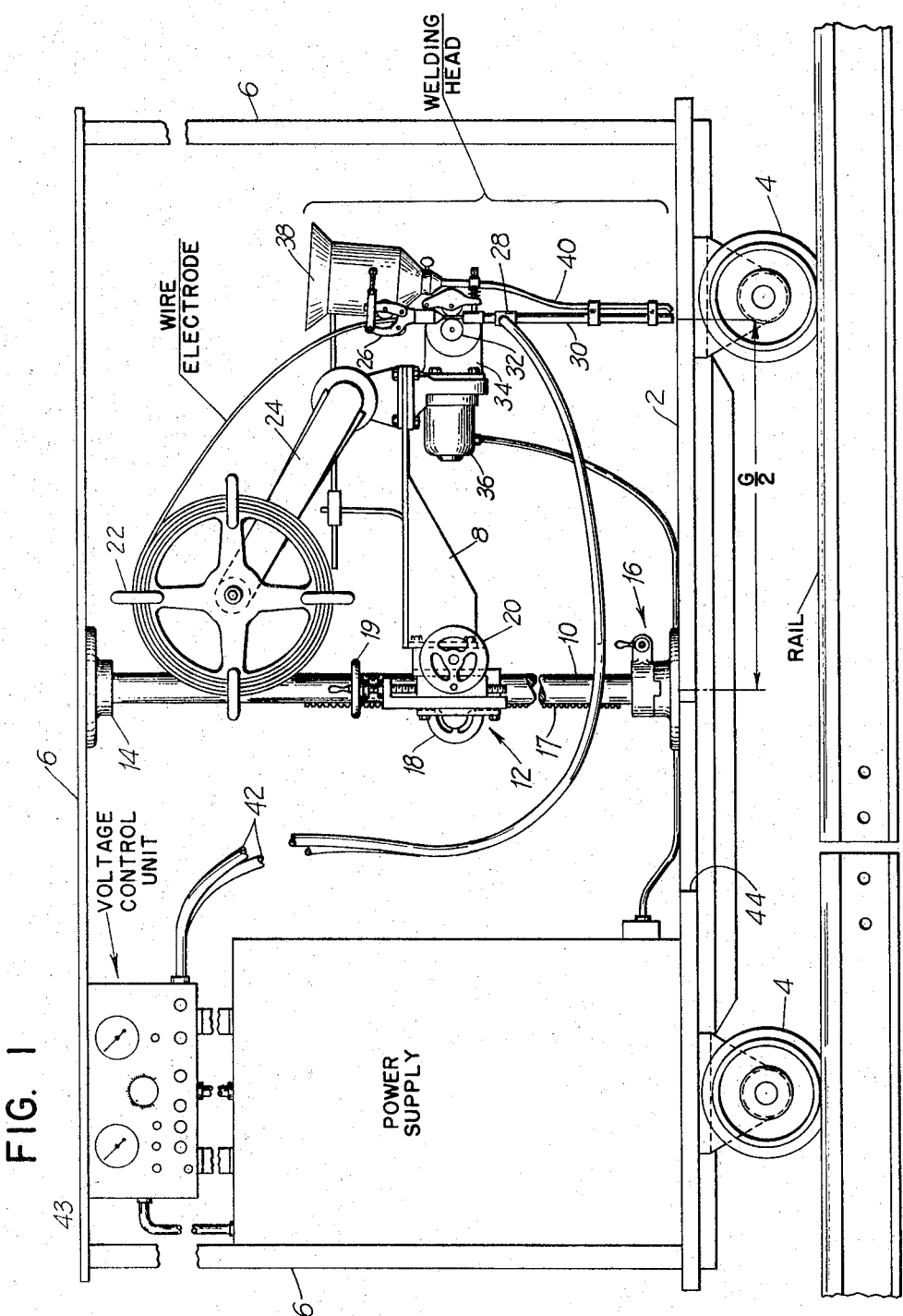
FIGURE 1 is a view, in elevation, of the front of a mobile unit embodying apparatus specially constructed and arranged in accordance with this invention, and adapted to perform the hereindisclosed method of welding according to the invention.
Figure 4:
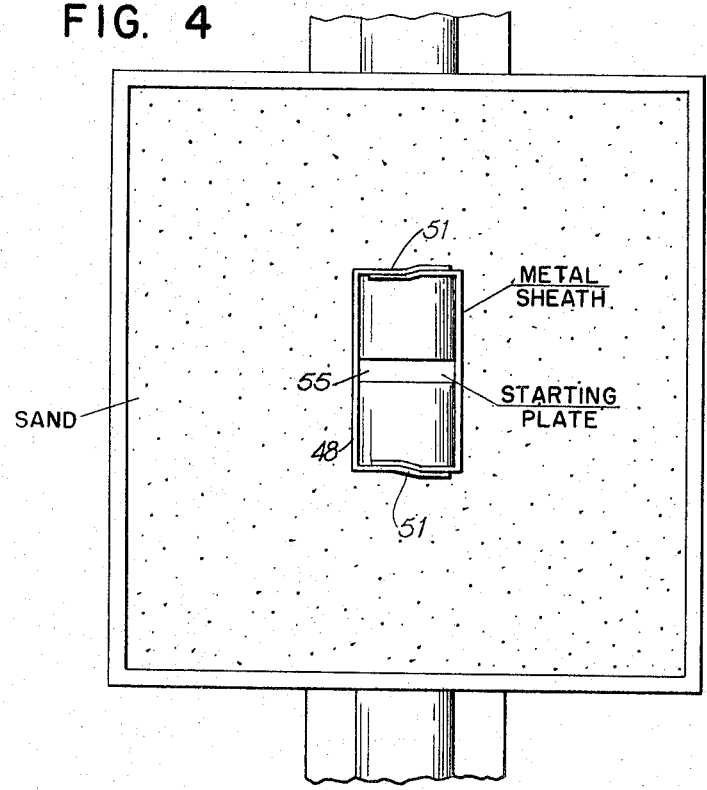
FIGURE 4 is a plan view of the type of mold shown in FIGURE 3, with the welding nozzle and composition tube removed.
Figure 3:
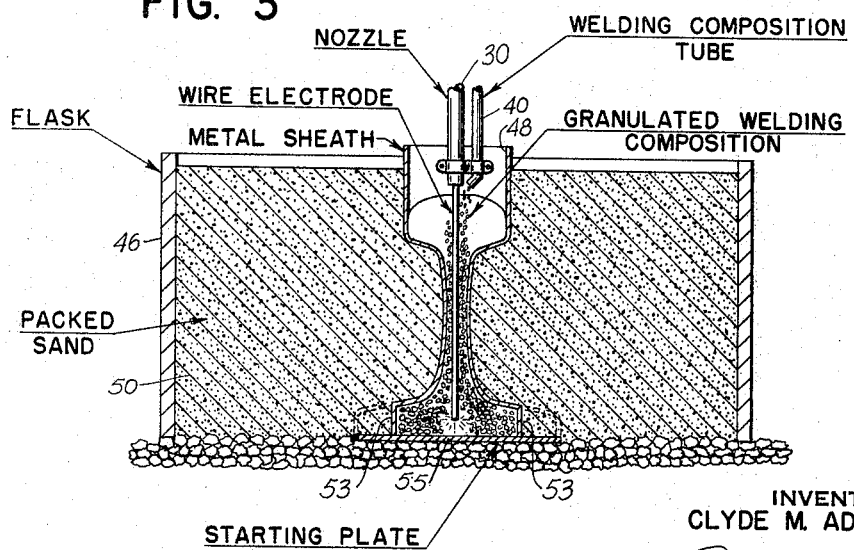
FIGURE 3 is a vertical cross sectional view, taken transverse to the rail length, of a foundry type sand mold and a rail joint at the initial stage of the welding operation.

In FIGURES 1 and 2 there is shown a mobile unit which is specially adapted for the welding of rails. This unit comprises basically a welding head, power supply and suitable controls, all combined as an essembly which is either permanently or removably mounted on a carriage adapted to travel along the track to successive weld locations. In the illustrated case, there is provided a platform 2 supported on the rails by flanged wheels 4 and having a protective outer cabinet structure 6. Doors or removable panels, not shown, desirably are provided at the sides of the cabinet 6 for full protection of the apparatus when not in use.

The devices which actively perform the welding, referred to collectively and designated generally as the "Welding Head" (FIGURE 1), are carried by an arm 8 which in turn is connected to a column 10 through means of a mounting assembly 12. The upper end of column 10 is freely journalled for rotation in a bearing collar carried by the top of cabinet 6. The lower end of the column is rotatably mounted in a bearing, generally designated at 16, which incorporates a clamp for locking the column and welding head carried thereby in the inactive position shown or in any other angular position. Mounting assembly 12 is rotatably fixed in relation to column 10, but through means of a rack 17 on the column and a pinion operated manually by a handwheel 18, major vertical welding head adjustments can be effected. Finer adjustments of the welding head both vertically and laterally are effected in conventional manner through manual operation of handwheels 19 and 20, respectively.

The welding head, voltage control unit and power supply individually constitute components which are commercially available and thoroughly understood by persons skilled in this art, and which, therefore, need be described only briefly. Uncoated, bare wire electrode is drawn from a spoke-type reel (preferably capable of handling the larger sizes of coils) supported by arm 24, and is fed through a roll type wire straightener 26, copper busbar 28 and contact nozzle 30 by means of a wire feeder comprising driven rolls 32. This wire feeder is driven by an electric motor 36 through a gear reduction unit 34. Associated with these parts are a hopper 38 adapted to store a supply of granulated slag-forming composition and a tube 40 leading therefrom downwardly to a point of delivery immediately adjacent the tip of nozzle 30. Hopper 38 may be provided with either a manually or automatically operated gate to regulate the rate of delivery of composition to the welding zone, though a manually operated gate will suffice because as explained hereafter the losses of composition due to volatilization, decomposition, etc. are small and do not represent a critical process variable. The purpose of busbar 28 is to conduct high amperage current, delivered through cables 42, to the nozzle 30, from which in turn it is conducted to the wire electrode at a location immediately adjacent the nozzle tip.

The illustrated welding head is of a type specifically designed and widely used principally for the production of horizontal seam welds, typically in curved or flat plate stock. Although there actually are great differences between that type of welding process and the process disclosed herein, nevertheless certain components of welding equipment used in the older form of welding are ideally adaptable to present purposes. The process involved in horizontal seam welding has been commonly referred to as "submerged arc" or "submerged melt" welding, so named because the welding takes place beneath a molten, electrically conductive layer of molten mineral composition. The principal purposes of this slag-forming composition are to protect the weld from air, to help contain the liquid metal, and to sustain an arc-like electrical discharge. As in other forms of arc welding, heat is generated by this electrical discharge, which in this case extends through the molten, non-metallic slag. To the end that constant "arc" voltage will be maintained, thereby to produce a uniform weld, two basic systems of automatic control chiefly are commonly employed. On the one hand, a constant potential generator can be used in conjunction with a wire feeder operating at constant speed, and on the other, constant voltage can be maintained by automatically varying the rate of electrode feed. Either of these control systems or other well known types can be used for purposes of this invention. A control unit operating on the principle of variable electrode feed has, in particular, been used successfully in practicing this invention, and is the type illustrated herein. Specifically, the wire feed motor 36 operates on the voltage across the arc, whereby variations in arc voltage cause corresponding changes in the wire feed rate to maintain essentially constant voltage. (This relation is consistent with the fact that arc voltage is proportional to arc length.) A voltage control unit fitting this description is manufactured and sold by the Linde Company, Division of Union Carbide Corporation, under the designation Series 2 USC–4. A welding head assembly as described above and as illustrated in FIGURES 1 and 2 also is available from the Linde Company under the catalog designation of USH–2. It should be noted that the nozzle 30 preferably is of the "deep-groove" type, and typically measures approximately 7/16 inch by 3/4 inch in cross section. Nozzles of this general type are generally designed to handle the more common 1/8, 5/32, 3/16 and 1/4 inch diameter electrode wires. Although this apparatus operates with only one wire electrode, it will be realized that the use of a nozzle and jaw assembly handling simultaneously a plurality of wire electrodes is within the comtemplation of this invention.

It has been found in practice that neither the polarity of the power supply connection in the workpiece (rail) and electrode, nor the matter of using direct or alternating current, represents any critical factor. Both A.C. and D.C. mobile power generators are commercially available and may be used for the present purpose, and in some cases other utility line or plant power may be available. Although either polarity hookup across the rail and electrode can be used, in common practice the polarity is "straight," electrode negative, as indicated schematically in FIGURE 10.

In a welding process according to this invention a highly significant feature involves a very large power input rate. The power supply for the welding head should be capable of producing 400 to 1,500 amps at a potential between 30 and 45 volts. A more detailed explanation of these and other process variables will be provided at a further portion of this description.

In operation, the entire welding head is swung to one side of the platform 2 and into a position wherein the nozzle 30 is directly above the space between a pair of adjacent rail ends. Adjustments to bring the nozzle finally into proper welding position are then effected by hand wheels 18, 19 and 20. Thereafter the welding operations are performed according to procedures described in detail hereafter. For the present, however, it is noted that the sides of the platform are cut back at 44 to provide accessibility over the rails. Also, it is noted that the radial distance from the axis of column 10 to nozzle 30 is identified G/2 in the drawings to indicate that it is one half the gauge G of track on which the apparatus is intended to be used. If desired, a welding head arrangement for mounting on trucks of different gauges can be constructed by incorporating simple length-adjusting means in the arm 8.

During the welding of a pair of adjacent rail ends as taught by the present invention, a pool of liquid slag floats on a rising pool of molten metal. For the purpose of containing these liquids at the sides of the joint there is provided an enclosure having certain details and thermal properties which will be described with reference to FIGURES 3 to 9. Although the enclosure may take any of various physical types, of which a few are illustrated herein, the principal factors to be considered are its thermal conductivity (or more exactly, as explained hereafter, its "heat diffusity"), the ability to contain molten metal and slag, the ease of handling and setting up, and cost.

Figure 5:
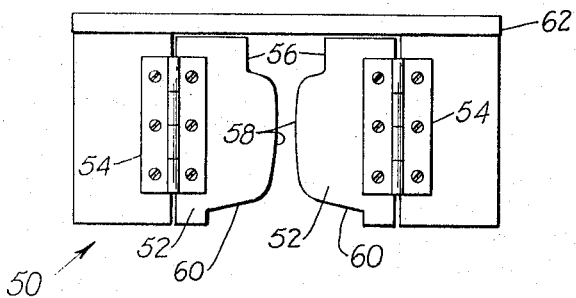
FIGURE 5 is an end view of a form of flask which may be used in connection with a foundry type mold as shown in FIGURES 3 and 4.
Figure 6:
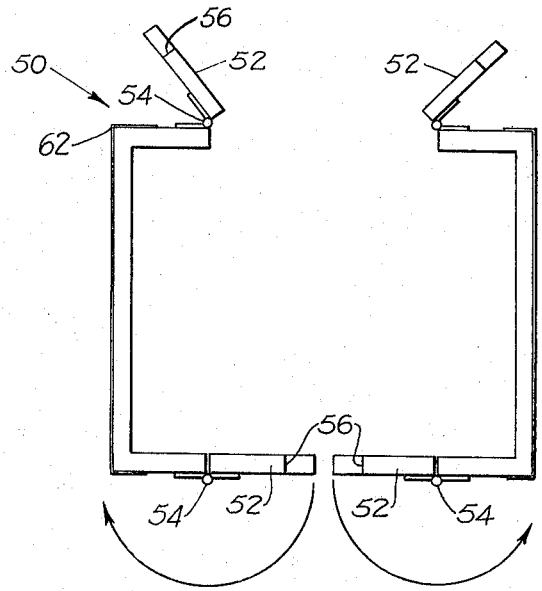
FIGURE 6 is a plan view of the flask shown in FIGURE 5.

Referring to FIGURES 3, 4, 5 and 6, there is illustrated an enclosure in the form of a "foundry type" sand mold. The principal mechanical parts of this mold are a box or "flask" 46, a metal sheath 48 bent to conform to the rail configuration, and foundry sand 50 packed against the sheath. A suitable construction for a flask is shown in FIGURES 5 and 6. At each end of the box there is a pair of doors 52 each mounted on a hinge 54. Each door 52 has a shape conforming to the side configuration of a particular type of rail (such as 132 pound rail), including a head portion 56, web portion 58 and flange portion 60. The box preferably is girded by a strengthening band or strip 62. In the use of this mold, the doors 52 first are swung outwardly and it is then lowered over the joint area between a pair of adjacent rail ends.

The doors 52 are then closed and, assuming the portions 56, 58 and 60 have been properly shaped, these doors will fit closely against the sides of the rails. Means (not shown) preferably are provided to lock or otherwise hold the doors in closed position against the force of packed sand in the flask. The sheath 48 is then put in place. Sheath 48 can be easily and cheaply formed from two pieces of a sheet metal which is sufficiently deformable to be bent to conform to the sides of the rail ends. The opposed halves of the sheath 48 are U-shaped, as viewed in FIGURE 4, and legs extending over the top of the rail head are overlapped at 51. Each half of the sheath 48 has a finger 53 cut therein, this finger being properly dimensioned to fit closely between the outer flanges of the rails and to abut a steel "starting plate" 55. Plate 55 is inserted beneath and across the ends of the rails for the purpose of establishing a ground connection and installing an arc at the beginning of welding. The fingers 53 can be omitted, with the sheath 48 then extending over the gap across the full flange width, though the disclosed arrangement is preferred for reasons discussed hereafter. Following the fitting of sheath 48, sand is placed in the flask and packed to maintain the sheath tightly in position. This sand mixture typically comprises 4% bentonite clay, 4% water and the remainder No. 80 mesh sand. In such fashion a mold cavity is generated in the sand mixture and in this respect it should be noted that in the course of welding the sheath 48 melts and becomes incorporated into the weld fusion zone.

Although a sand mold of considerable thickness is provided at the sides of the rails in the setup illustrated in FIGURES 3 to 6, it is permissible to provide molded sand of less than an inch thickness at the sides of the rails.

As an alternate form of the type of flask shown in FIGURES 5 and 6, the flask can be split in two halves. The necessity for doors 51 is thereby avoided. This two-piece type of flask is held in place by suitable clamps acting at opposite sides.

Figure 7A:
FIGURES 7A, 7B and 7C illustrate a foundary type sand mold which is formed through the use of a removable solid mold pattern instead of a metallic sheath as in FIGURES 3 and 4.
Figure 7B:
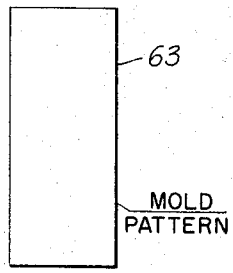
Figure 7C:
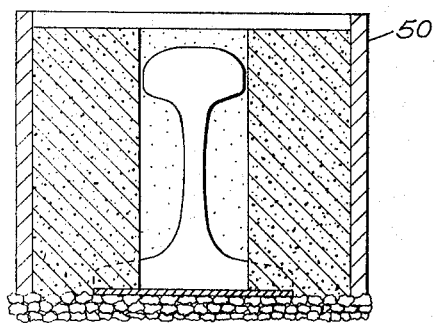

Referring to FIGURES 7A, 7B and 7C, there is illustrated a modified form of molding operation wherein a metal sheath is not used to generate a mold cavity. FIGURES 7A and 7B showing an oblong, flat mold pattern 63 which is inserted between the adjacent rail ends while the sand is packed into the outer box or flask 59. The width of pattern 63 preferably is slightly greater than the width of the head of the rail, and its thickness is only slightly less than the spacing between adjacent rail ends. Following packing of the sand the mold pattern 63 is removed and the mold is then ready for welding.

Figure 8:
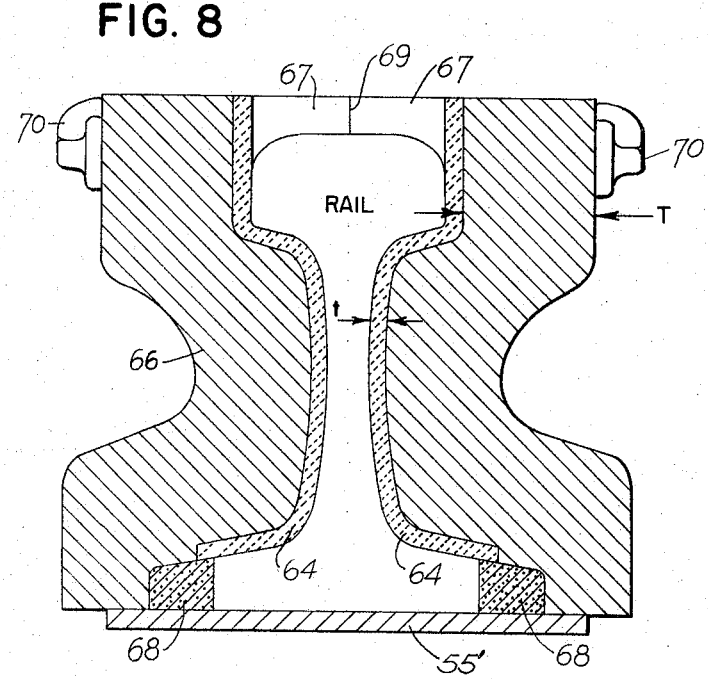
FIGURE 8 is a vertical cross section through a type of mold or enclosure comprising refractory shell inserts and a heavy metal backup support.
Figure 9:
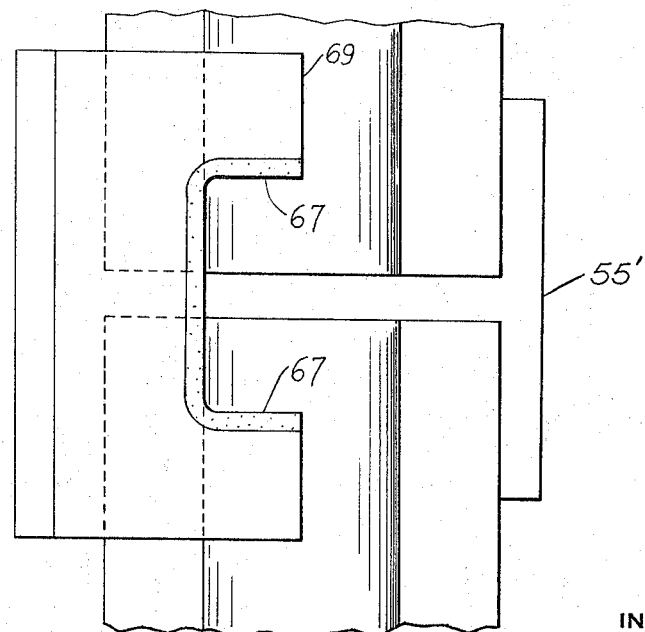
FIGURE 9 is a plan view of the type of mold or enclosure shown in FIGURE 8, but with only one-half of the same in place.

Other materials, in addition to sand, can be used to form a mold enclosing the welding zone. Ordinary refractory material in general will be found to be satisfactory. The term "refractory" is intended to refer to the types of materials used to line furnaces and in other applications where resistance to heat is a requisite. A typical example of a refractory material is ordinary fire clay. A particularly desirable form of refractory mold is one wherein precast, ceramic shell type inserts are clamped or otherwise held around the joint. A mold of this type is shown in FIGURES 8 and 9. Indicated at 64 are ceramic inserts having a wall thickness $t$ which may range from a fraction of an inch to several inches. As evident in FIGURE 8, these ceramic inserts 64 have a shape which conforms to the sides of the adjacent rail ends against which the inserts are held by compatibly contoured heavy iron pieces 66. The iron pieces 66 are securely held in place by a clamp 70 or the like, and serve not only to hold the refractory shell inserts 64 but also to act as a self-protective heat sink. Inserts 64 have legs 67 which extend over the top of the rail heads and abut each other at 69. The thickness T of the walls of the heavy iron pieces 66 may be of the order of an inch or more. The inserts 64 cover only the tops of the rail flange portions and do not extend downwardly beyond the edges thereof. The cavity between the outer flange portions of adjoining rails is plugged by a molding compound having a formable consistency and being composed typically of a sand, clay and water mixture. Other cracks and openings also are plugged with molding compound where necessary.

In practice, the mold employing refractory shell inserts, as in FIGURES 8 and 9, can be set up more quickly than a foundry type sand mold as in FIGURES 3 to 7. Though the shell inserts 64 do not melt in the welding process, they tend to be eroded by the molten slag and weld metal. This is no problem, however, because the ceramic inserts or pieces can be cheaply produced in volume and are considered disposable after use for one weld.

In the preparation of a rail joint for welding by apparatus and method according to this invention, the principal steps are the insertion of the starting plate and placement of the enclosure, which may be one of the forms shown in FIGURES 2 through 9. Also, any mechanical joint connectors should be disassembled and removed. In some cases it may be found desirable to cut off the rail end portions having bolt holes, and in such case the spikes holding one of the rails are merely loosened and this rail is moved a short distance to compensate for the portion removed. However, it should be noted that in general no direct treatment of the rail ends is necessary other than checking to insure that the rails are properly aligned.

The spacing of the rail ends prior to welding is not a critical factor in welding according to this invention. It will be recognized that, theoretically, this gap need be only slightly greater than the diameter of the electrode wire used, though the clearance must be sufficient to avoid premature arcing from the sides of the electrode to the rails. A gap of from ½ inch to one inch is quite satisfactory and welding with a gap of one to two inches or more definitely is possible. The significant factor, however, is that with a closer spacing, say ½ inch to ¾ inch, a favorably smaller weight of electrode metal is deposited, power consumption is lower, and welding time is shorter.

With regard to the other materials used, namely the wire electrode and slag-forming composition, these are materials which are completely common in the welding industry. As discussed hereafter, wire electrode of ⅛, 5/32, 3/16 and ¼ inch diameters are of primary adaptability for the present invention because of various technical factors as well as considerations of easy handling in coils and commercial availability. Because of the need to conduct electricity to the wire electrode through a busbar and nozzle arrangement, the wire electrode is uncoated. The analysis of wire electrode used depends on the desired hardness and commonly approximates that of the rail metal. With regard to the flux or slag forming composition, any of a variety of standard, commercially available compositions can be used. The general character of the composition is that it is composed of iron, manganese, silicon, calcium and other oxides, and has a melting point which generally is below that of rail steel. Although the chemistry of the slag apparently is not critical other than as an influence on melting point, for use with refractory molds it is preferable that the slag should not have too great a solvent action, as this tends to cause excessive erosion of the mold.

Preliminary to a summary of operations and procedures according to the invention, it should be understood that the invention is characterized by adaptability to a wide range of rail sizes and types. The standard rail length for American railroads is 39 feet, with weights per yard ranging from less than 100 pounds upwardly to around 175 pounds, the heavier sizes being used primarily as crane rail in installations such as naval yards and docks. The rail comprises open hearth steel having a carbon content typically exceeding 0.60%. For ordinary passenger and freight lines, the rail is supplied from the mills in the normalized condition (air cooled from above 1,500° F.), the purpose of such treatment being to refine the grain and thereby obtain somewhat greater hardness and strength and lower ductility. For certain installations such as yards and docks, where the track must bear unusually heavy static loading, specially hardened rails are used. This invention is equally applicable to the welding of either unhardened or hardened rails. The only difference between the two situations, in practice, is that in the case of unhardened rail the finished joint will have a hardness nearly the same as that of adjoining rail portions, whereas in the case of welding hardened rail a post-weld rehardening of the joint and adjacent areas will be found desirable. As previously mentioned, the invention is applicable to the welding of both light and heavy rail sizes, the only difference there being that slightly more time, weld metal and power will be consumed in direct proportion to the size of the rail.

The production of a complete weld can now be described. As preliminary steps, the welding apparatus (shown in FIGURES 1 and 2) is wheeled into position straddling the gap between a pair of adjacent rails. Prior to this time any alignment of the rails or unusual preparation of the rail ends that is found necessary is performed. The starting plate 55 (or 55') is then inserted beneath the ends of the rails and, if need be, gravel, sand or the like is packed beneath this plate to support it firmly. A strip of heat resistant board also can be passed beneath the rail ends and the starting plate to provide the needed support thereof. An enclosure or mold, preferably one of the embodiments shown in FIGURES 2 to 9 is then placed over the joint area in the manner previously described. This is followed by swinging of the welding head into place above the separated rail ends, and the nozzle 30 is lowered to a position wherein its tip is directly adjacent the top of the joint. If desired, the nozzle 30 can be inserted deeply into the cavity between adjacent rail ends and raised progressively during welding, although in practice it has been found that completely satisfactory results can be obtained by holding the nozzle 30 stationary at the top of the joint. By operation of the control panel 43 the wire feeder 32 is caused to feed wire electrode downwardly to a position poised directly above the starting plate 56, the power supply to the electrode being turned off during this step so that arcing does not occur. Actually this initial positioning of the wire electrode can be accomplished by effecting the feeding of a predetermined length of electrode beyond the nozzle tip prior to lowering of the nozzle into position. From hopper 38 there is now supplied a quantity of granulated slag forming composition sufficient to fill the lower portion of the cavity. At this point the supply of power to the wire electrode through busbar 28 and nozzle 30 can be initiated. Thereupon is instantly established a flow of current between the wire electrode and the starting plate, which is accompanied by melting of portions of the slag forming composition and of the electrode. Meanwhile, the wire electrode continues to be fed by wire feeder 32 and the voltage control unit acts to maintain a constant voltage across the electrical discharge zone. As electrode is fed downwardly and "consumed," or melted, due to the heat generated in the electrical discharge zone there is developed a pool of liquid metal. Naturally, the heat generated in this process is sufficiently great that adjoining portions of the rail ends become liquid and mix with the liquid electrode metal. On top of this pool of liquid metal there is a floating layer of liquid slag which, in turn, supports a reserve quantity of granulated slag forming composition. It may be noted that at least a portion, and possibly all, of the starting plate melts and enters the weld. As welding progresses the levels of the metals and slag pools move upwardly and, also, a zone of solidified metal begins to develop. As solidification occurs, weld metal comprising approximately half filler metal and half rail metal is, in effect, cast with the sections of rail. A schematic illustration of conditions existing at this intermediate stage in the process is provided by FIGURE 10. As the progressive upward movement of these layers of metal and slag takes place, of course, portions of the adjoining rail ends are melted as previously mentioned. Eventually, the zone of electrical discharge arrives at the top of the joint and liquid slag is permitted to overflow across the tops of the rail heads. It will be realized that the liquid metal and the liquid slag floating thereon are supported at two sides by the rail ends, at the bottom by the starting plate, and at the two other sides by the mold positioned thereat. Following the discontinuation of welding current all of the metal and slag will quickly solidify, and thereafter the mold is removed from about the fused joint.

For technical reasons discussed hereafter, a significant factor is that a given measure of energy is injected into the process at a high rate, with the lower limit of rate of power input being approximately 12 kilowatts or equivalent, for satisfactory fusion of rails heavier than 100 pounds per yard. The rate at which electrode metal is "consumed" or melted will, naturally, be proportional to the rate of power input. The linear speed at which electrode must be fed to keep pace with its consumption depends (in inverse relation) on the electrode cross sectional area or mass per unit length. Thus, in the presently described fusion process the electrode feed rate can be within the range of 30–240 inches per minute, though a preferred range is 50–120 inches per minute. At a given rate of power input the use of smaller electrode sizes, such as 1/8 inch diameter, will then require the use of higher linear feed rates within the aforesaid ranges, and the use of larger electrode sizes, such as 1/4 inch diameter, will require the use of the lower linear feed rates within such ranges. The electrode size is related also to the "current density," which for present purposes is intended to mean the amps flowing per square inch of electrode cross section. The range of current density has a lower limit of 20,000 amps per square inch and extends upward to approximately 80,000 amps per square inch, though a more satisfactory range is 30,000 to 50,000 amps per square inch. The use of smaller electrode sizes will result in higher current densities within these ranges, and the use of larger electrode sizes will result in the lower current densities. Current densities within the 20,000 to 80,000 range are recommended in the interest of maintaining stable arc operation because densities outside this range tend to result in erratic arc behavior due to discontinuous burn-off of the continuously fed electrode wire. In particular, at very high current density levels there is a tendency to unstable operation due to melting of electrode before it enters the established discharge zone. A lower current limit of 400 amps is dictated by the requirement of a certain minimum power input, and an upper limit of 1,500 amps is imposed mainly by practical considerations involving availability of high amperage power supplies. Thus the current range roughly is 400 to 1,500 amps, but preferably current should fall within the narrower range of 600 to 1,200 amps. The process variable to be considered finally is voltage, which falls within the range of 30–45 volts. Though voltages outside this range may be used, problems can arise in connection with maintenance of stable arc operation. At lower voltages there is risk of contact between the electrode tip and the liquid metal pool, which can result in erratic short circuiting of the arc. At the other extreme, i.e. with high voltage, instability of the arc is likely because of its long length. A preferred range of voltage is 35 to 43 volts.

As specific examples, the welding can be satisfactorily performed using 1/8 inch diameter electrode with power supplied at 610 amps and 35 volts. The current density in such case is about 50,000 amps per square inch and the electrode wire is fed and consumed at about 110 inches per minute. With 1/4 inch diameter electrode welding can be performed at 40 volts and 980 amps. The current density then will be about 20,000 amps per square inch and the electrode consumed and fed at about 40 inches per minute.

Because the impedance characteristics of the electric welding circuit supplied by the power source are almost purely resistive, the above voltage and amperage values may be taken as applicable to either alternating current or direct current operation.

It will be understood that although the described apparatus and process have been developed around the use of 1/8 to 1/4 inch wire electrode, the invention is not so limited in scope. This particular type of electrode has been stated as being preferable mainly because of its widespread commercial availability, the convenience of handling the flexible wire in coils, and the existence of highly developed components of apparatus for welding with such electrode. Furthermore, with regard to amperage and voltage ranges, it should be recognized that many practical considerations have entered into the selection of such ranges for purposes of disclosure. Among these practical considerations are the following: (a) the maintenance of stable and trouble-free operation in the field, (b) avoiding the need for highly skilled operators to perform the welding, (c) insensitivity to slight variables such as might occur in the setting up of equipment and in preparation of rails for welding, and (d) avoiding the necessity of using very special electrodes and slag-forming compositions.

Figure 11:
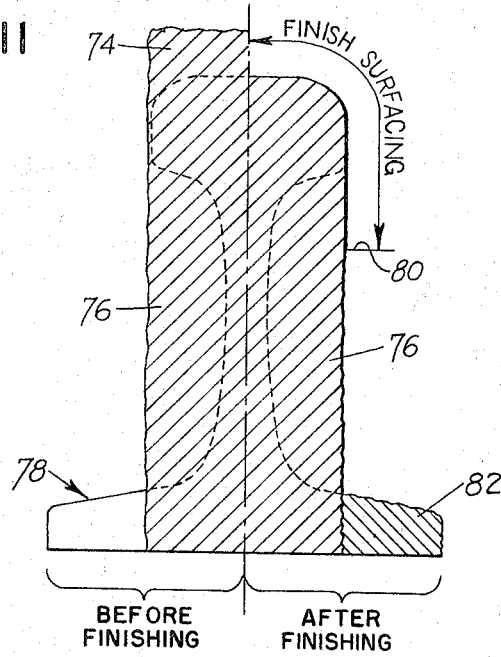
FIGURE 11 is a cross section of a finished weld, the left and right halves thereof constituting the rail cross section before and after finishing, respectively.

The final finishing of the welded joint will be described with reference to FIGURES 11 and 12. First, it is important to note the extent of what may be termed the "weld zone," which is the zone within which the rail metal is melted, mixed and fused with electrode filler metal. This zone is roughly defined by a "fusion boundary" indicated by line 72 in FIGURE 12. Referring to FIGURE 11, the cross section of the joint before finishing is indicated at the left and the cross section after finishing is indicated at the right. Before finishing, the weld metal extends above the rail head at 74, and beyond the rail surface in the area 76 at the web. An absence of deposited material exists at the space 78, which is within the outer edge portions of the rail flanges. With regard to the finishing of the working rail surface by grinding, such finishing is necessary only to the extent that the rail will be engaged by flanged train wheels. Thus it is necessary to remove only the excess deposit 74, and grind or otherwise smooth the rail surface at the sides thereof only to the approximate level indicated at 80. The deposit 76 is not removed as it does not interfere in any way with the use of the rail. The space 78 desirably is filled by a manual arc weld.

The influence which a highly insulative mold and high instantaneous current density have on factors such as quality of weld, effects on adjacent rail portions, completeness of fusion, and process efficiency, is a major consideration which can be more easily understood through analysis of the heat transfer phenomena involved. There is involved essentially a rapidly changing balance between the electrical input which is converted to heat and the dissipation of this heat, principally by conduction through the rails and the enclosing mold. A first phenomenon is the particular relations of rate of power input to thermal efficiency, to width of "heat affected" zones and to the rate of solidification. A certain minimum total energy input is, of course, required to melt the metal which ultimately becomes involved in the weld. Total heat input may be measured as the rate of input multiplied by the welding time and, as a matter of thermal efficiency, the total heat input actually decreases with decreasing weld time. Stated differently, the more quickly the heat is injected, the higher the thermal efficiency. The same phenomenon causing this result is responsible for other consequences of the high rate of power input, namely, that the width of the heat affected zone is minimized and beneficially rapid solidification takes place. It has been determined that the width of each heat affected region adjacent the weld is directly proportional to the total heat input, and that the solidification rate of the weld metal is inversely proportional to the total heat input. Hence, beneficial effects can be obtained by reducing total heat input and, reverting to the above statements, it will be seen that this can be achieved by very rapidly injecting heat into the process. Rapid solidification is beneficial in that it results in better hardness, strength, and toughness, and makes the weld metal more amenable to heat treatment if this happens to be of interest. The width of the "heat affected" zone is of particular importance only in dealing with specially hardened rail, in that this term signifiies the loss of hardness in adjacent regions. Nevertheless, the minimizing of heat affected areas is an important attribute of the invention because in certain respects the welding of continuous rail in yards and docks, where hardened rail is used, is of greater importance than welding of continuous rail on regular freight and passenger lines. In the case of unhardened rail, post-weld heat treatment is unnecessary for ordinary purposes. It will be found, in practice, that in this case the affected areas of the rail in and adjacent the weld zone will be of the same order of hardness as the unaffected portions of the rail.

In connection with the discussion of solidification rate, it should be noted that the cooling rate is not high enough to present the risk of forming hard, brittle, cracked, sensitive and heat affected structures. This cooling rate is the same or somewhat higher than that which the steel underwent in its last heat treatment at the mill. It is for this reason, as noted above, that the welded rails will not display hardness differing considerably from that of the rails prior to welding.

A second important area of heat transfer phenomena, as affecting the quality of the weld, involves the insulating barrier imposed by the mold at the sides of the weld. Of the total heat delivered to the weld region it is desirable that the major fraction of the heat be removed from the weld region by conduction longitudinally through the rail ends, with the remaining minor fraction being removed by conduction through the mold. In determining the thermal conductivity that a mold should have, the guiding factor is that the ratio of heat (per unit area) escaping longitudinally through the rail ends to heat escaping through the mold walls should be greater than 5 to 1. If a highly heat conductive mold is used a relatively larger fraction of the weld heat will be permitted to flow through the mold. Such a condition will give rise to a detrimental chilling effect which will cause embrittlement and cracking at surface locations which are subjected to this rapid cooling. Also, in a "chill" mold, i.e. one in which heat can escape in more than one principal direction, there is danger of pronounced incomplete fusion and incomplete penetration of the rail ends, particularly in the region where welding is started and at the edges of the weld. As an example, if a steel or copper mold were used, as compared to the ratio mentioned above the heat flow per unit area into the rail ends and into the mold would be roughly equivalent, giving rise inevitably to the difficulties mentioned. In accordance with the invention, complete fusion and penetration of the rail ends, including the starting location and the edges, is promoted by an insulative mold which compels the far greater fraction of weld heat to escape from the weld region by longitudinal conduction into the rails themselves.

Figure 10:
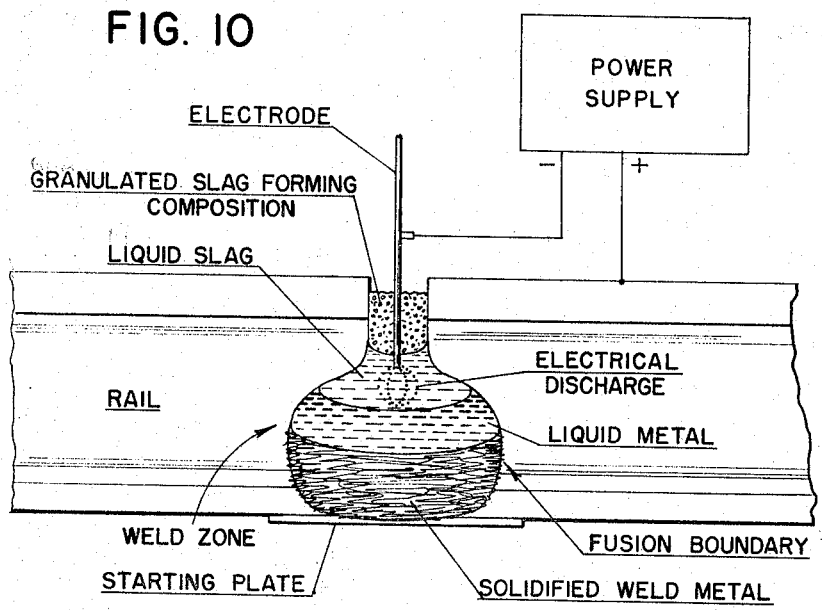
FIGURE 10 is a schematic illustration, representing a vertical lengthwise section through the rails, of the liquid and solid states of the metal and slag at an intermediate stage in the welding operation.

In defining the thermal properties of the mold, the term "heat diffusivity" will be used, which may be described as a measure of the heat absorbing capacity of a solid when its bounding surface is suddenly heated to elevated temperature. Heat diffusivity is the product $KdC$, where $K$ is the thermal conductivity of a material in B.t.u. sq. ft./hr./° F./ft.; "$d$" is the density of the material in pounds per cubic foot; and "$C$" is the specific heat of the material in B.t.u./lb./° F. Using established thermal properties of steel, the heat diffusivity value, or $KdC$, is about 1,550. For a refractory molding material such as sand, this value is about 30. Since rate of heat flow is a square root function of heat diffusivity, in the case of sand it can be said that (per unit area) roughly seven times as much heat enters the rail as enters the mold. For the satisfactory production of welds in accordance with this invention, the mold preferably should have a heat diffusivity, as defined, of less than 60. This objective can be served either by using the all refractory aggregate mold, such as sand, or the expendable refractory shell inserts in conjunction with a permanent metal backing (FIGURES 9 and 10). In connection with refractory shell inserts, it should be noted that it is principally in the early, highly transient heat flow stage of welding that the mold has its effect and, therefore, it is possible to use a refractory shell insert of quite thin construction.

Although the invention has been described in connection with the welding of rails arranged substantially in axial alignment, it will be understood that the invention is applicable to other types of juncture between rails; for example, this welding can be carried out on rail frogs, crossings and the like. Also, this invention is applicable in the welding of heavy steel members, other than rail specifically, and wherein the problems are the same as those presently involved.

In conclusion, the invention disclosed herein attains all of the objects set forth in the introduction hereto. It will be understood that various departures from the specifically disclosed invention can be effected without departing from the scope thereof as defined by the following claims.

What is claimed is:

1. A method of enclosed electric welding to joint a pair of rails having their end surfaces arranged to form a welding space, comprising the steps of providing an enclosure at the sides of said space adapted to contain liquid metal and slag and having a heat diffusivity $KdC$ of less than 60, wherein $K$=thermal conductivity in B.t.u./sq. ft./hr./° F./ft.
$d$=density in lb./cu. ft., and
$C$=specific heat in B.t.u./lb./° F.

feeding consumable electrode downwardly within said space passing high amperage electric current through said electrode and a zone at the lower end thereof to cause melting of the electrode, and supplying a layer of slag-forming composition over the liquid metal in said space.

2. A method of enclosed electric welding to join a pair of rails having their end surfaces arranged to form a welding space, comprising the steps of providing a refractory material at the sides of said space as an enclosure adapted to contain liquid metal and slag, feeding consumable electrode downwardly within said space, passing high amperage electric current through said electrode and a zone at the lower end thereof to cause melting of the electrode, and supplying a layer of slag-forming composition above the liquid metal in said space.

3. A method of enclosed electric welding to join a pair of rails having their end surfaces arranged to form a welding space, comprising the steps of providing a foundry type sand mold at the sides of said space adapted to contain liquid metal and slag, feeding consumable electrode downwardly within said space, passing high amperage electric current through said electrode and a zone at the lower end thereof to cause melting of the electrode, and supplying a layer of slag-forming composition above the liquid metal in said space.

4. A method of enclosed electric welding to join a pair of rails having their end surfaces arranged to form a welding space, comprising the steps of feeding consumable electrode downwardly within said space, passing high amperage electric current through said electrode and a zone at the lower end thereof to cause melting of the electrode, supplying a slag-forming composition above the liquid metal in said space, and enclosing the joint thus being formed between said end surfaces with a mold serving to containing the liquid metal and slag in said space and having a heat diffusivity of $KdC$ of less than 60, where $K$=thermal conductivity in B.t.u./sq. ft./hr./° F./ft.
$d$=density in lb./cu. ft., and
$C$=specific heat in B.t.u./lb./° F.

5. A method of enclosed electric welding to join a pair of rails having their end surfaces arranged to form a welding space, comprising the steps of providing a non-metallic insulating material at the sides of said space as an enclosure adapted to contain liquid metal and slag, feeding consumable electrode downwardly within said space, passing high amperage electric current through said electrode and a zone at the lower end thereof to cause melting of the electrode, and supplying a layer of slag-forming composition above the liquid metal in said space.

6. A method of enclosed electric welding to join a pair of rails having their end surfaces arranged to form a welding space, comprising the steps of providing an enclosure at the sides of said space adapted to contain liquid metal and slag and having a heat diffusivity $KdC$ of less than 60, wherein $K$=thermal conductivity in B.t.u./sq. ft./hr./° F./ft.
$d$=density in lb./cu. ft., and
$C$=specific heat in B.t.u./lb./° F.

feeding consumable electrode downwardly within said space, passing high amperage electric power greater than 12 kilowatts through said electrode and a zone at the lower end thereof to cause melting of the electrode, and supplying a layer of slag-forming composition over the liquid metal in said space.

7. A method of enclosed electric welding to join a pair of rails having their end surfaces arranged to form a welding space, comprising the steps of providing a foundry type sand mold at the sides of said space adapted to contain liquid metal and slag, feeding consumable wire electrode of ⅛ to ¼ inch diameter downwardly within said space, passing high amperage electric power greater than 12 kilowatts through said electrode and a zone at the lower end thereof to cause melting of the electrode, and supplying a layer of slag-forming composition above the liquid metal in said space.

8. A method of enclosed electric welding to join a pair of rails having their end surfaces arranged to form a welding space, comprising the steps of providing a refractory material at the sides of said space as an enclosure adapted to contain liquid metal and slag, feeding consumable wire electrode of ⅛ to ¼ inch diameter downwardly within said space, passing high amperage electric power greater than 12 kilowatts through said electrode and a zone at the lower end thereof to cause melting of the electrode, and supplying a layer of slag-forming composition above the liquid metal in said space.

9. A method of enclosed electric welding to join a pair of rails having their end surfaces arranged to form a welding space, comprising the steps of providing a refractory material at the sides of said space as an enclosure adapted to contain liquid metal and slag, feeding consumable wire electrode downwardly within said space, passing high amperage electric power greater than 12 kilowatts through said electrode and a zone at the lower end thereof to cause melting of the electrode maintaining the arc voltage at said zone at a fixed level between 30 and 45 volts while feeding said electrode, and supplying a layer of slag-forming composition above the liquid metal in said space.

10. A method of enclosed electric welding to join a pair of rails having their end surfaces arranged to form a welding space, comprising the steps of providing a foundry type sand mold at the sides of said space adapted to contain liquid metal and slag, feeding consumable wire electrode downwardly within said space, passing high amperage electric power greater than 12 kilowatts through said electrode and a zone at the lower end thereof to cause melting of the electrode, maintaining the arc voltage at said zone at a fixed level between 30 and 45 volts while feeding said electrode, and supplying a layer of slag-forming composition above the liquid metal in said space.

11. A method of enclosed electric welding to join a pair of rails having their end surfaces arranged to form a welding space, comprising the steps of providing a non-metallic insulating material at the sides of said space as an enclosure adapted to contain liquid metal and slag, feeding consumable wire electrode of between ⅛ and ¼ inch diameter downwardly within said space, passing 400 to 1,500 amps of electric current through said electrode and a zone at the lower end thereof to cause melting of the electrode, and supplying a layer of slag-forming composition above the liquid metal in said space.

12. A method of enclosed electric welding to join a pair of rails having their end surfaces arranged to form a welding space comprising the steps of providing a non-metallic insulating material at the sides of said space as an enclosure adapted to contain liquid metal and slag, feeding consumable wire electrode downwardly within said space, passing electric current through said electrode and a zone at the lower end thereof to cause melting of the electrode, said current being within the range of 400 to 1,500 amps at a substantially constant voltage between 30 and 45 volts, and supplying a layer of slag-forming composition above the liquid metal in said space.

13. A method of enclosed electric welding to join a pair of rails having their end surfaces arranged to form a welding space, comprising the steps of providing a non-metallic insulating material at the sides of said space as an enclosure adapted to contain liquid metal and slag, feeding consumable wire electrode downwardly within said space, passing 600 to 1,200 amps electric current through said electrode and a zone at the lower end thereof to cause melting of the electrode at 35 to 45 volts, and supplying a layer of slag-forming composition above the liquid metal in said space.

14. A method of enclosed electrical welding to join a pair of rails having their end surfaces arranged to form a welding space, comprising the steps of providing a non-metallic insulating material at the sides of said space as an enclosure adapted to contain liquid metal and slag and having a heat diffusivity K$d$C of less than 60, wherein $K$=thermal conductivity in B.t.u./sq. ft./hr./° F./ft.
$d$=density in lb./cu. ft., and
$C$=specific heat in B.t.u./lb./° F.

feeding ⅛ to ¼ inch diameter consumable wire electrode downwardly within said space, supplying electric current within the range of 400 to 1,500 amps through said electrode and a zone at the lower end thereof to cause melting of the electrode, maintaining the arc voltage at said zone at a fixed level between 30 and 45 volts, and supplying a layer of slag-forming composition over the liquid metal in said space, said feeding of electrode being effected at a substantially constant rate corresponding to the rate of melting of said electrode.

15. A method of enclosed electric welding to join a pair of rails having their end surfaces arranged to form a welding space, comprising the steps of providing an enclosure at the sides of said space adapted to contain liquid metal and slag and having a heat diffusivity K$d$C of less than 60, wherein $K$=thermal conductivity in B.t.u./ sq. ft./hr./° F./ft.
$d$=density in lb./cu. ft., and
$C$=specific heat in B.t.u./lb./° F.

feeding consumable wire electrode downwardly within said space, feeding 400 to 1,500 amps of electric current through said electrode and a zone at the lower end thereof to cause melting of electrode at a substantially constant voltage between 30 and 45 volts, and supplying a layer of slag-forming composition over the liquid metal in said space.

16. A method of enclosed electric welding to join a pair of rails having their end surfaces arranged to form a welding space, comprising the steps of providing an enclosure at the sides of said space adapted to contain liquid metal and slag and having a heat diffusivity K$d$C of less than 60, wherein $K$=thermal conductivity in B.t.u./sq. ft./hr./° F./ft.
$d$=density in lb./cu. ft., and
$C$=specific heat in B.t.u./lb./° F.

feeding consumable wire electrode downwardly within said space, supplying electric current within the range of 600 to 1,200 amps through said electrode and a zone at the lower end thereof to cause melting of the electrode, said feeding of electrode and supplying of electric current being effected to cause melting of electrode at a substantially constant rate and maintenance of a substantially constant arc voltage within the range of 30 to 45 volts, and supplying a layer of slag-forming composition over the liquid metal in said space.

17. A method of enclosed electric welding to join a pair of rails having their end surfaces arranged to form a welding space, comprising the steps of providing an enclosure at the sides of said space adapted to contain liquid metal and slag and having a heat diffusivity K$d$C of less than 60, wherein $K$=thermal conductivity in B.t.u./sq. ft./hr./° F./ft.
$d$=density in lb./cu. ft., and
$C$=specific heat in B.t.u./lb./° F.

feeding consumable wire electrode of ⅛ to ¼ inch cross-section downwardly within said space, passing high amperage electric current at a current density in the range of 20,000 to 80,000 amps per square inch through said electrode and a zone at the lower end thereof to cause melting of the electrode, and supplying a layer of slag-forming composition over the liquid metal in said space.

18. A method of enclosed electric welding to join a pair of rails having their end surfaces arranged to form a welding space, comprising the steps of providing an enclosure at the sides of said space adapted to contain liquid metal and slag and having a heat diffusivity K$d$C of less than 60, wherein $K$=thermal conductivity in B.t.u./sq. ft./hr./° F./ft.
$d$=density in lb./cu. ft., and
$C$=specific heat in B.t.u./lb./° F.

feeding consumable wire electrode of ⅛ to ¼ inch cross-section downwardly within said space, supplying at least 12 kilowatts electric power at a current density of 30,000 to 50,000 amps per square inch through said electrode and a zone at the lower end thereof to cause melting of the electrode, and supplying a layer of slag-forming composition over the liquid metal in said space.

19. A method of enclosed electric welding to join a pair of rails having their end surfaces arranged to form a welding space, comprising the steps of providing an enclosure at the sides of said space adapted to contain liquid metal and slag and having a heat diffusivity K$d$C of less than 60, wherein $K$=thermal conductivity in B.t.u./sq. ft./hr./° F./ft.
$d$=density in lb./cu. ft., and
$C$=specific heat in B.t.u./lb./° F.

feeding consumable wire electrode downwardly within said space, supplying at least 12 kilowatts electric power at a current density within the range of 20,000 to 80,000 amps per square inch through said electrode and a zone at the lower end thereof to cause melting of the electrode, and supplying a layer of slag-forming composition over the liquid metal in said space.

20. A method of enclosed electric welding to join a pair of rails having their end surfaces arranged to form a welding space comprising the steps of providing a non-metallic insulating material at the sides of said space as an enclosure adapted to contain liquid metal and slag, feeding consumable wire electrode downwardly within said space, passing electric current through said electrode and a zone at the lower end thereof to cause melting of the electrode, said current being within the range of 400 to 1,500 amps and having a current density within the range of 20,000 to 80,000 amps per square inch cross section in the electrode, and supplying a layer of slag-forming composition above the liquid metal in said space.

21. A method of enclosed electric welding to join a pair of rails having their end surfaces arranged to form a welding space, comprising the steps of feeding consumable electrode downwardly within said space, passing high amperage electric current through said electrode and a zone at the lower end thereof to cause melting of the electrode, supplying a slag-forming composition above the liquid metal in said space, and enclosing the joint thus being formed between said end surfaces with a mold serving to contain the liquid metal and slag in said space and having a low heat diffusivity such that the ratio of heat dissipated by conduction longitudinally through the rail ends to heat dissipated by conduction through said mold is of the order of at least 5 to 1.

22. A method of forming an enclosure around the spaced ends of rails or the like preparatory to enclosed electric welding thereof to form a joint, comprising the steps of placing around the sides of said rails at the location of said joint a frame in the nature of a foundry flask adapted to contain a molding aggregate, placing a mold pattern between said ends to occupy the space therebetween, placing and packing a molding aggregate within said frame and around said pattern and the adjacent rail surfaces, and removing said pattern.

23. The method according to claim 22, wherein said molding aggregate comprises basically sand mixed with a binder material.

24. A method of forming an enclosure around the spaced ends of rails or the like preparatory to enclosed electric welding thereof to form a joint, comprising the steps of placing a metallic plate spanning said rail ends at the bottoms thereof, placing around the sides of said rails at the location of said joint a frame in the nature of a foundry flask adapted to contain a molding aggregate, placing a mold pattern between said ends to occupy the space therebetween, placing and packing a molding aggregate within said frame and around said pattern and the adjacent rail surfaces, and removing said pattern.

25. A method of forming an enclosure around the spaced ends of rails or the like preparatory to enclosed electric welding thereof to form a joint, comprising the steps of spanning the outer surfaces of adjoining rails with a sheath member to close the open sides of the space between said rail ends, placing around the sides of said rails at the location of said joint a frame in the nature of a foundry type flask adopted to contain a molding aggregate, and placing and packing a molding aggregate within said frame and around the outside of said sheath.

26. The method according to claim 25, wherein said molding aggregate comprises basically sand mixed with a binder material.

27. In combination, a pair of rails having their end surfaces arranged to form a welding space, means closing off the bottom of said space, a frame in the nature of a foundry flask defining a closed space around the location of the ends of said rails, and a molding aggregate packed within said frame and having a cavity formed therein, said cavity having walls closing the sides of the space between said end surfaces and being adapted to contain liquid metal and slag formed therein in the course of electric welding.

28. The combination according to claim 27, wherein said aggregate comprises basically sand mixed with a binder material.

29. The combination according to claim 27, wherein the first-mentioned means comprises a metal plate spanning said ends at the bottom of said space.

30. In combination, a pair of rails having their end surfaces arranged to form a welding space, means closing off the bottom of said space, separate refractory shell insert pieces overlapping the ends of said rails at the sides of said space, said pieces being contoured to conform generally to the sides of the rail cross section and being adapted to contain liquid metal and slag formed in said space in the course of welding, and means retaining said pieces in place during such welding.

31. The combination according to claim 30, wherein the last-mentioned means comprises a heavy, permanent metal backing member behind each of said pieces.

32. The invention according to claim 30, wherein the first-mentioned means comprises a metal plate at the bottom of said space.

33. A method of enclosed electric welding to join a pair of rails comprising the steps of arranging said rails with their end surfaces in spaced relation to provide a welding space, placing around the sides of said rails at the location of said welding space a frame in the nature of a foundry flask adapted to contain a molding aggregate, placing a mold pattern between said end surfaces to occupy said welding space therebetween, placing and packing a molding aggregate within said frame and around said pattern and the adjacent rail surfaces, removing said pattern, feeding consumable electrode downwardly within said welding space, passing high amperage electric current through said electrode and a zone at the lower end thereof to cause melting of the electrode, supplying a layer of slag-forming composition above the liquid metal in said space, interrupting said electric current after said welding space has been substantially filled with melted electrode metal, and removing said frame and molding aggregate.

References Cited by the Examiner

UNITED STATES PATENTS

| 1,176,899 | 3/1916 | Jacobs | 219—101 |
| 1,451,264 | 4/1923 | Kleinschmidt | 219—101 |
| 1,914,878 | 6/1933 | Begtrup | 22—204 |
| 1,992,677 | 2/1935 | Sorenson | 22—129 |
| 2,314,917 | 3/1943 | Baird | 219—125 |
| 2,357,376 | 9/1944 | Baird | 219—125 |
| 2,824,952 | 2/1958 | Zoethout | 219—137 |

FOREIGN PATENTS 761,680 11/1956 Great Britain.

RICHARD M. WOOD, *Primary Examiner.*